US008893054B2

(12) United States Patent
Amento et al.

(10) Patent No.: US 8,893,054 B2
(45) Date of Patent: Nov. 18, 2014

(54) DEVICES, SYSTEMS, AND METHODS FOR CONVEYING GESTURE COMMANDS

(75) Inventors: Brian Amento, Morris Plains, NJ (US); Karrie J. Hanson, Westfield, NJ (US); Kevin A. Li, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 180 days.

(21) Appl. No.: 12/963,281

(22) Filed: Dec. 8, 2010

(65) Prior Publication Data

US 2012/0151420 A1   Jun. 14, 2012

(51) Int. Cl.
*G06F 3/00* (2006.01)
*G06F 3/01* (2006.01)

(52) U.S. Cl.
CPC ........................................ *G06F 3/017* (2013.01)
USPC .......................................... 715/863; 345/173

(58) Field of Classification Search
USPC .......................................... 715/863; 345/173
See application file for complete search history.

(56) References Cited

U.S. PATENT DOCUMENTS

| 5,757,360 | A | 5/1998 | Nitta | |
|---|---|---|---|---|
| 7,301,529 | B2 | 11/2007 | Marvit | |
| 7,333,090 | B2 | 2/2008 | Tanaka | |
| 7,365,736 | B2 * | 4/2008 | Marvit et al. | 345/156 |
| 2005/0212767 | A1 | 9/2005 | Marvit | |
| 2009/0051648 | A1 * | 2/2009 | Shamaie et al. | 345/156 |
| 2010/0138798 | A1 * | 6/2010 | Wilson et al. | 715/863 |
| 2010/0199228 | A1 * | 8/2010 | Latta et al. | 715/863 |
| 2011/0261213 | A1 * | 10/2011 | Rottler et al. | 348/211.6 |
| 2012/0054620 | A1 * | 3/2012 | Tilley et al. | 715/727 |
| 2012/0095862 | A1 * | 4/2012 | Schiff et al. | 705/26.7 |

* cited by examiner

*Primary Examiner* — Tadeese Hailu
*Assistant Examiner* — Andrew Chung
(74) *Attorney, Agent, or Firm* — Hartman & Citrin LLC

(57) ABSTRACT

Devices, systems, and methods are disclosed which relate to conveying gestures associated with commands by displaying images that a user associates with a gesture. Upon performance of the gesture, the commands are carried out by a device, system, etc. For example, a mobile device displays a gesture icon of a hammer. The gesture icon is labeled with a command. When a user makes a downward motion with the forearm, the mobile device senses that gesture through a gesture sensor. The mobile device interprets the gesture and executes the command in the label of the gesture icon.

20 Claims, 7 Drawing Sheets

FIG. 3

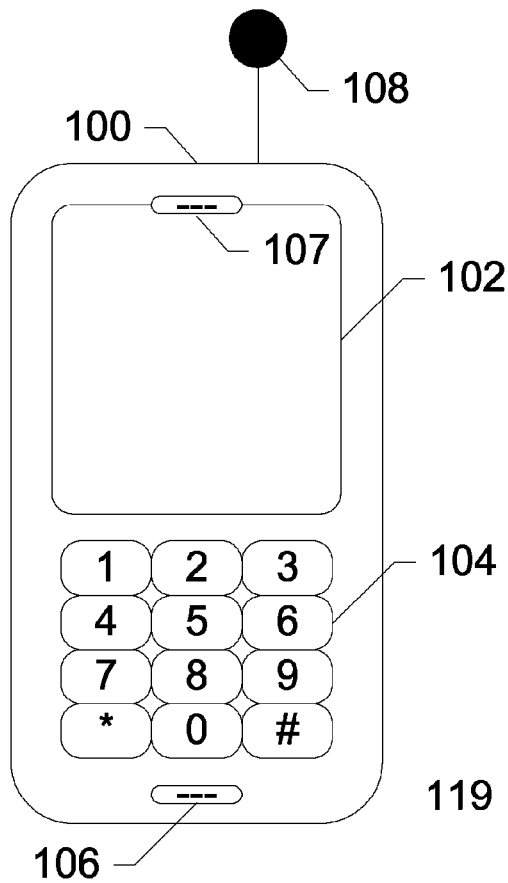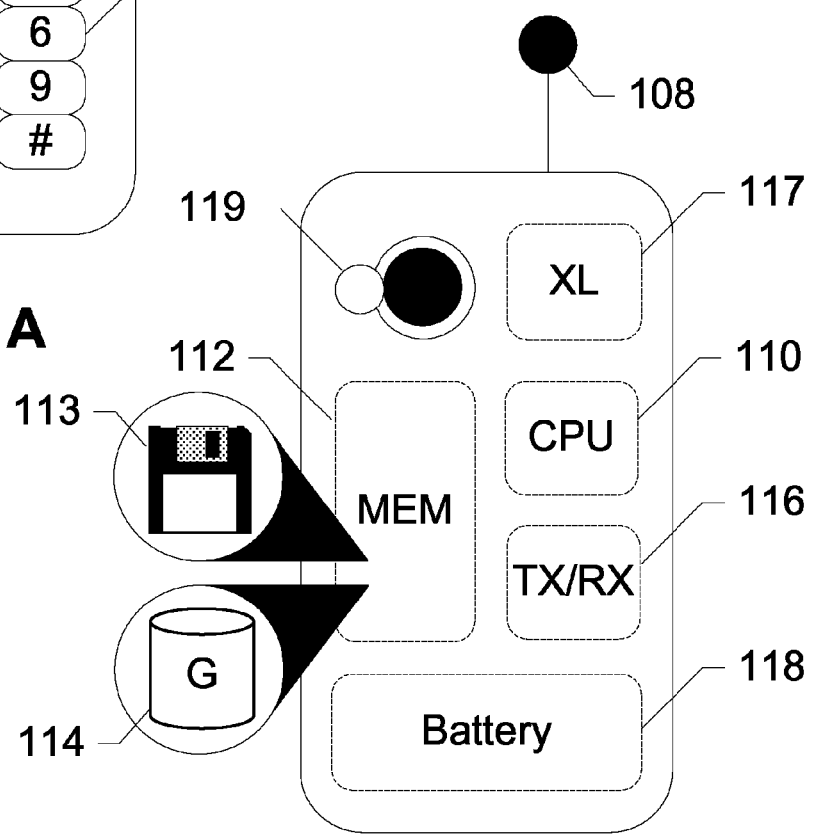
FIG. 1A
FIG. 1B

DEVICES, SYSTEMS, AND METHODS FOR CONVEYING GESTURE COMMANDS

BACKGROUND OF THE SUBJECT DISCLOSURE

1. Field of the Subject Disclosure

The present subject disclosure relates to conveying gesture commands. More specifically, the present subject disclosure relates to conveying a particular gesture using a static image.

2. Background of the Subject Disclosure

Mobile devices, such as cellular telephones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

The small size of mobile devices limits the usability of the traditional inputs such as keyboards or selections on a display. Mobile device designers are creating a panoply of solutions, including new keyboards, new touch interfaces, voice interfaces, etc. However, few designers are using the ability to sense 3-d motion of the device, because it is difficult to train a user to make a consistent motion to allow the device to correctly detect and categorize the gesture.

Gestures offer a promising input modality for mobile devices, enabling new forms of interaction. Additionally, gestures can be useful for interacting with mobile devices eyes-free when the user may not be able to look at the display. Especially useful are gestures in 3-d space generated by physically moving the device.

One of the problems that designers of gesture-driven applications face is how to convey the set of acceptable gestural inputs to the user. Current systems, such as the NINTENDO WII, use video clips with an actor demonstrating how to move the device around. These video clips require users to watch the entire video to learn just one gesture. As a result, this approach does not support glanceability, a desirable trait for displaying many gestures in an interface. Thus, this approach does not scale to systems that accept tens or hundreds of gestures as input.

SUMMARY OF THE SUBJECT DISCLOSURE

The present subject disclosure conveys gestures associated with commands by displaying images that a user associates with a gesture. Upon performance of the gesture, the commands are carried out by a device, system, etc. In exemplary embodiments, a mobile device displays a gesture icon of a hammer. The gesture icon is labeled with a command. When a user makes a downward motion with the forearm, the mobile device senses that gesture through a gesture sensor. The mobile device interprets the gesture and executes the command in the label of the gesture icon.

Gesture icons are presented as iconic representations of gestures. Gesture icons overcome time-based limitations of video-based systems by leveraging a user's past experiences. By using images of objects familiar to users, an interface conveys a gesture using a static image. Not only are the objects familiar, but they are readily associated with a substantially uniform gesture. When presented with a hammer gesture icon, a substantial amount of users respond with a downward hammering motion. Moreover, gestures performed are tied to an action associated with a real object, making them more acceptable in social settings.

In one exemplary embodiment, the present subject disclosure is a device for conveying a gesture associated with a command. The device includes a processor, a gesture sensor in communication with the processor, a display in communication with the processor, a memory in communication with the processor, a gesture database on the memory, and a gesture logic on the memory for displaying a gesture icon with a menu command on the display, receiving a gesture through the gesture sensor, determining that a command matches the gesture, and executing the command.

In another exemplary embodiment, the present subject disclosure is a system for conveying a gesture associated with a command. The system includes a computer having a processor and a memory, a display in communication with the computer, a gesture sensor in communication with the computer, a gesture database on the memory, and a gesture logic on the memory for displaying a gesture icon with a menu command on the display, receiving a gesture through the gesture sensor, determining that a command matches the gesture, and executing the command.

In yet another exemplary embodiment, the present subject disclosure is a method of conveying a gesture associated with a command. The method includes displaying a gesture icon with a menu command on a display, receiving a gesture through a gesture sensor, determining that a command matches the gesture, and executing the command.

BRIEF DESCRIPTION OF THE DRAWINGS

FIG. 1A shows a mobile device for conveying a gesture command, according to an exemplary embodiment of the present subject disclosure.

FIG. 1B shows the inner components of a mobile device for conveying a gesture command, according to an exemplary embodiment of the present subject disclosure.

DETAILED DESCRIPTION OF THE SUBJECT DISCLOSURE

Figure 2:
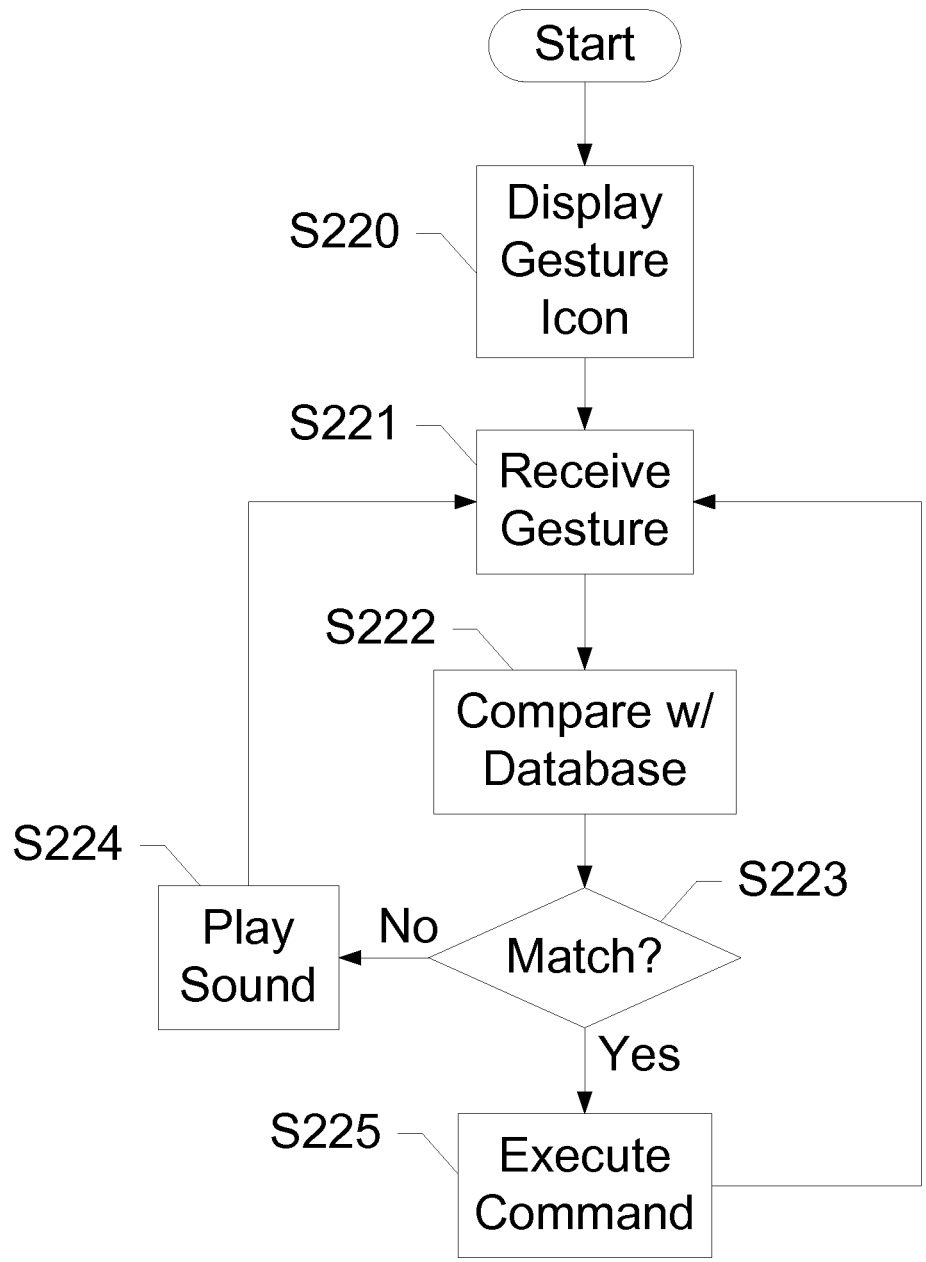
FIG. 2 shows a flow chart for conveying a gesture command, according to an exemplary embodiment of the present subject disclosure.

The present subject disclosure conveys gestures associated with commands by displaying images that a user associates with a gesture. Upon performance of the gesture, the commands are carried out by a device, system, etc. In exemplary embodiments, a mobile device displays a gesture icon of a hammer. The gesture icon is labeled with a command. When a user makes a downward motion with the forearm, the mobile device senses that gesture through a gesture sensor. The mobile device interprets the gesture and executes the command in the label of the gesture icon.

Findings suggest that when presented with images of certain types of objects, users will generally produce the same gestures. There are certain object properties that make for a good gesture icon, such as one that all users respond similarly, and a poor gesture icon, such as one where user responses diverge into a very large set of potential actions.

A gesture, as used herein and throughout this disclosure, refers to any motion of the limbs or body. A "gesture sensor", as used herein and throughout this disclosure, refers to any electronic device capable of sensing a gesture. Examples of gesture sensors include accelerometers, gyroscopes, magnetometers, cameras, etc. The type of gesture sensor used may affect the types of gestures it can sense. For instance, a handheld accelerometer can sense gestures of the hand much more effectively than gestures of the body of the user. However, a camera can sense gestures of the hand and body, but cannot sense orientation of the gesture.

A "gesture icon", as used herein and throughout this disclosure, refers to an icon associated with a gesture. Good gesture icons yield substantially consistent gestures across users as well as high user confidence in their gestures (e.g. hammer). Bad gesture icons yield a variety of different gestures across participants, as well as lower confidence (e.g. flashlight). There is also a third class of gesture icons that yield consistent gestures across participants although with lower confidence (e.g. baseball). Gesture icons of objects that have one main, common usage, and are wielded along a predictable path of motion seem to produce more consistent gestures across users. However, if the object is not held in the same manner that one holds a mobile device, then it is less effective as a gesture icon, from a user's perspective.

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network. A memory can store applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1A shows a mobile device 100 for conveying a gesture command, according to an exemplary embodiment of the present subject disclosure. Mobile device 100 includes a display 102, a keypad 104, a microphone 106, a speaker 107, and an antenna 108. Display 102 is a liquid crystal display (LCD) which serves as a visual output for the user. Display 102 is used to display a gesture icon with a command label. Keypad 104 is an input for entering information and commands to mobile device 100. Microphone 106 accepts aural input and allows mobile device 100 to deliver voice communication to the network and other mobile devices. Speaker 107 outputs audio and also allows voice communication with other mobile devices. Antenna 108 sends and receives wireless radio frequency (RF) signals to and from wireless networks and other wireless devices.

FIG. 1B shows the inner components of a mobile device 100 for conveying a gesture command, according to an exemplary embodiment of the present subject disclosure. The inner components of mobile device 100 include a processor 110, a memory 112 including a gesture logic 113 and a gesture database 114, a transceiver 116, an accelerometer 117, a battery 118, and a camera 119. Processor 110 receives input and issues commands to deliver output through the other components. Memory 112 holds information for enabling processor 110 to operate the other components of mobile device 100, and contains gesture logic 113. Gesture logic 113 allows mobile device 100 to interpret a gesture and execute a command displayed in the label of a gesture icon. Gesture database 114 stores a plurality of gestures, and each gesture has an associated threshold. Transceiver 116 converts wireless signals received by antenna 108 to information capable of processing by processor 110, and vice-versa. Transceiver 116 can use one or more wireless protocols, including cellular RF, WiFi, BLUETOOTH, etc., to communicate with the network and other mobile communication devices. Battery 118 powers mobile device 100. Accelerometer 117 and camera 119 both serve as gesture sensors. When a user performs a gesture on mobile device 100, either accelerometer 117 or camera 119 detects the gesture.

There are many embodiments of a mobile device that are capable of being equipped with the present subject disclosure. For instance, many legacy model cellular telephones are capable of executing the borrowing logic described above. In other embodiments of the mobile communication device, other displays are used, such as an LED display, OLED display, etc. In some embodiments, the display is used as a touch-sensitive input device, i.e. a touch screen. A touch screen allows the user to view output on the display as well as use the display to provide input. In some touch screen embodiments, the mobile device may not have a physical keypad for input. Instead, a virtual keypad is displayed on the touch screen and the user inputs by touching the virtual keys. Other forms of input such as full keyboards, accelerometers, motion sensors, etc., can be utilized in the mobile device. The memory can be a non-removable internal memory, or a removable memory such as in a subscriber identity module (SIM) card or a memory card inserted into a memory card reader. Many mobile devices have more than one transceiver or a transceiver that supports more than one protocol. For instance, it is not uncommon for a mobile device to support cellular radio frequency (RF), WiFi, and BLUETOOTH® protocols.

FIG. 2 shows a flow chart for conveying a gesture command, according to an exemplary embodiment of the present subject disclosure. The process begins when a gesture icon is displayed S220 on a display 102 of a mobile device 100. The gesture icon is labeled with a command. A user of the mobile device 100 views the icon and desires to execute the command in the label. The gesture icon shows an image that the user readily associates with a gesture. The user performs that gesture on the mobile device 100. An accelerometer 117 on the mobile device 100 detects the gesture and generates a digital output corresponding to the gesture S221. The digital output of the gesture is then compared with digital outputs of other gestures in a gesture database 114 S222. It is then determined whether there is a match between the gesture database 114 and the performed gesture S223. If a gesture in the gesture database 114 associated with the gesture icon matches the gesture performed by the user, then the command in the gesture icon label is executed S225. If no gestures in the gesture database 114 match the gesture performed by the user, then a sound indicating a match failure is played for the user S224. In either case, the mobile device 100 is set to receive another gesture.

Mobile devices are just one type of device that can run this process. A desktop computer, notebook computer, Personal Digital Assistant (PDA), multi-touch interactive table, tablet PC, smart television, etc., equipped with a gesture sensor, can be used to input gesture commands. Different devices can accommodate different environments. The process can be executed on a visual input for a video game system, such as the KINECT for the XBOX 360, a kiosk in a store, or a remote control for a set-top box, to name just a few examples. Others examples and uses are also possible and within the purview of the present subject disclosure. Different gesture sensors may be more suitable for detecting gestures depending on the device. For instance, a mobile device can 100 accept gestures performed on the device itself by including an accelerometer 117 to detect the movement and orientation. A desktop computer may benefit more from a camera which can detect movement optically. However, a desktop computer may still have an external device with an accelerometer, such as an air mouse, for gesture input. Instead of playing a sound, devices may use other ways to alert the user of a match failure. In some embodiments a message is displayed on the display. Some embodiments include vibrators which may send a tactile alert to the user when a match is not found. In further embodiments, each gesture in the gesture database 114 has an associated threshold. It is considered that two performances of the same gesture may not produce exactly the same digital output from a device. Therefore, a threshold is set, within which a match is found, outside of which a match is not found. When gesture logic 113 compares a user input gesture with a gesture in the gesture database 114, the gesture logic 113 must determine that the user input gesture falls within the threshold of the gesture in the gesture database 114 in order to execute the command associated with the gesture in the gesture database 114.

Figure 3:
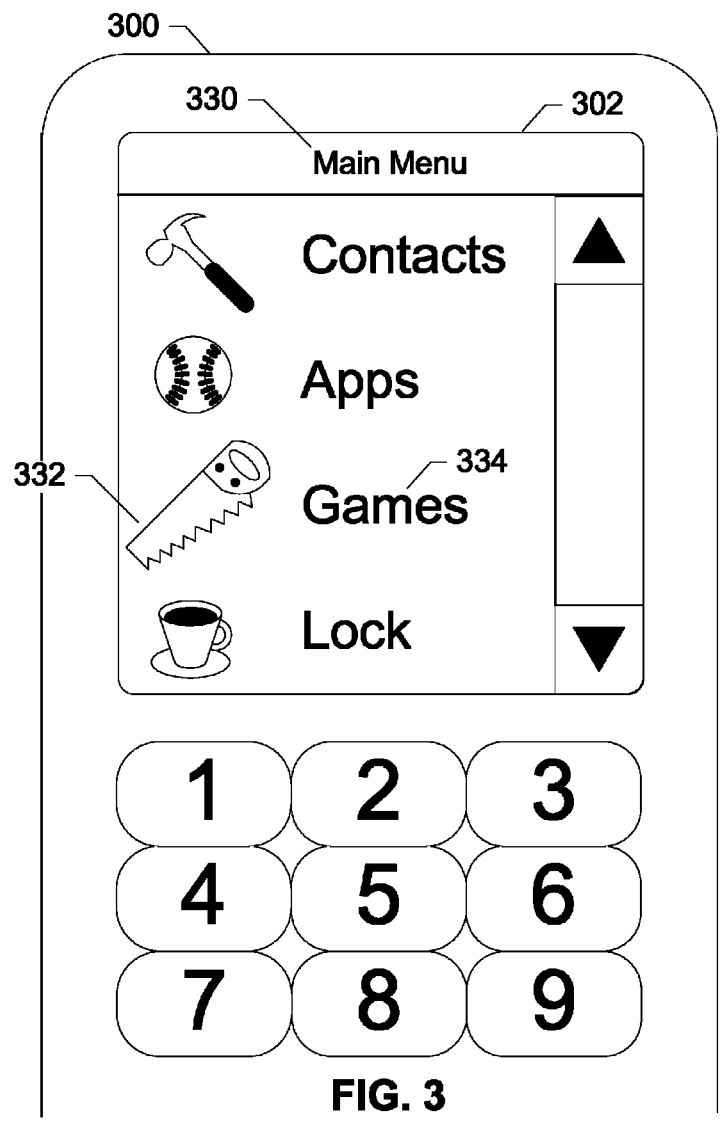
FIG. 3 shows a menu conveying gesture commands on a mobile device, according to an exemplary embodiment of the present subject disclosure.

FIG. 3 shows a menu 330 conveying gesture commands on a mobile device 300, according to an exemplary embodiment of the present subject disclosure. Menu 330 is shown on display 302 of mobile device 300. Menu 330 is a list of options for the user of mobile device 300 to choose from. Each option includes a gesture icon 332 and a corresponding command label 334. When the user performs a gesture associated with gesture icon 332, a command indicated by the command label 334 is executed. Different gesture icons are associated with different commands. For instance, the "Contacts" command, when executed, displays a list of the user's contacts. The "Apps" command, when executed, displays a menu of other applications on the mobile device. The "Games" command, when executed, displays a menu of other games on the mobile device. Finally, the "Lock" command, when executed, locks the screen of the phone and prevents unauthorized access.

Figure 4:
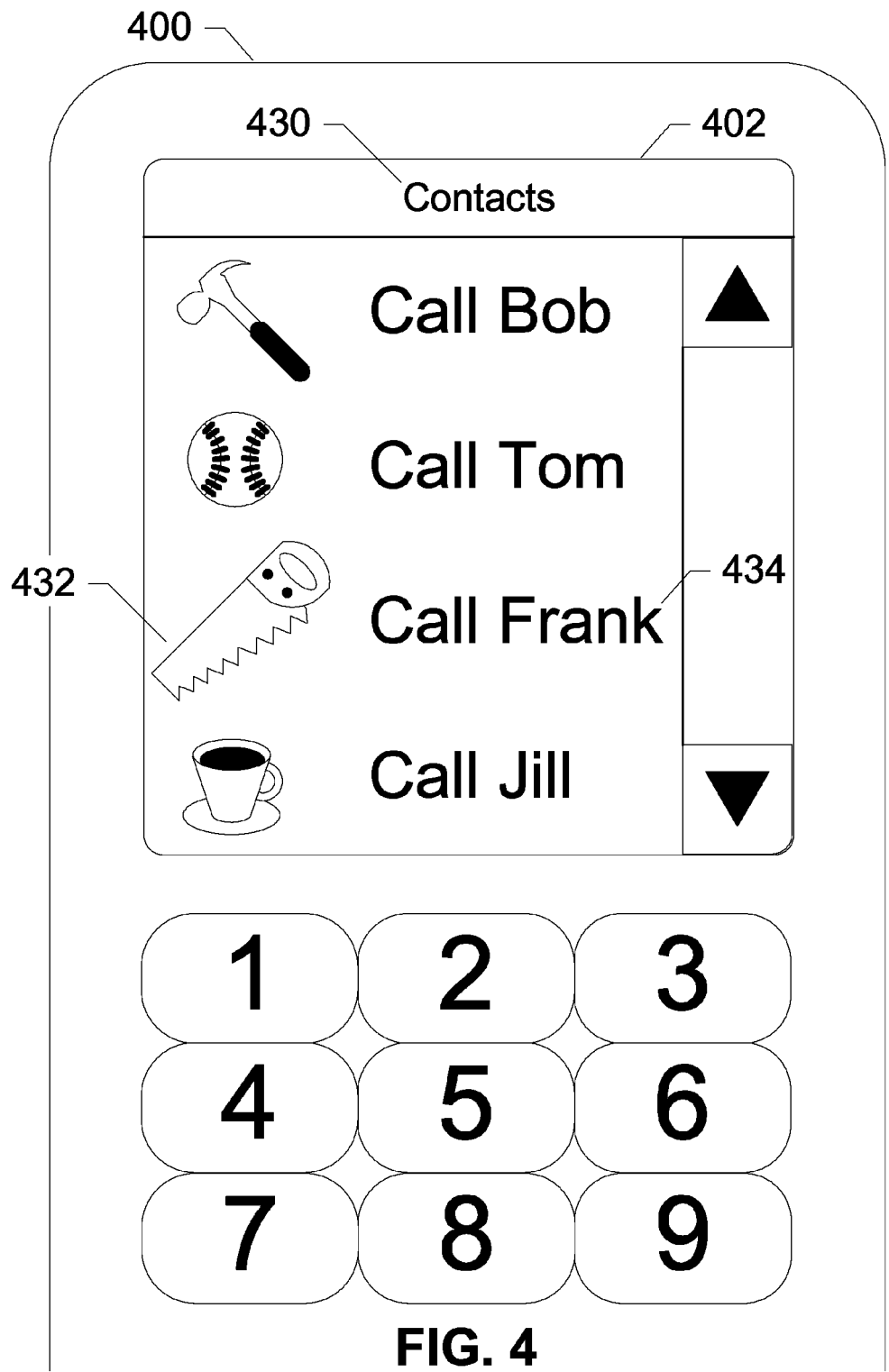
FIG. 4 shows a contacts list conveying gesture commands on a mobile device, according to an exemplary embodiment of the present subject disclosure.

FIG. 4 shows a contacts list 430 conveying gesture commands on a mobile device 400, according to an exemplary embodiment of the present subject disclosure. Contacts list 430 is shown on display 402 of mobile device 400. Contact list 430 is a list of contacts with whom to communicate by placing a call, sending a text message, sending an email, etc. Each contact includes a gesture icon 432 and a corresponding command 434. When the user performs a gesture associated with a gesture icon 432, command 434 is executed. In this embodiment, command 434 is "Call Frank", and the gesture icon is a saw. When the user makes a back-and-forth "saw" motion, the mobile device places a call to Frank.

In other embodiments, the contacts list simply lists the contacts instead of commands to call each contact. When a gesture is performed next to a contact in this list, a command is executed to display a menu listing options for mediums to communicate with the contact. For instance, performing a gesture associated with the contact "Tom" executes a command to display a menu of options for communicating with Tom. These options include "Call Tom", "Text Tom", "Email Tom", etc.

Figure 5:
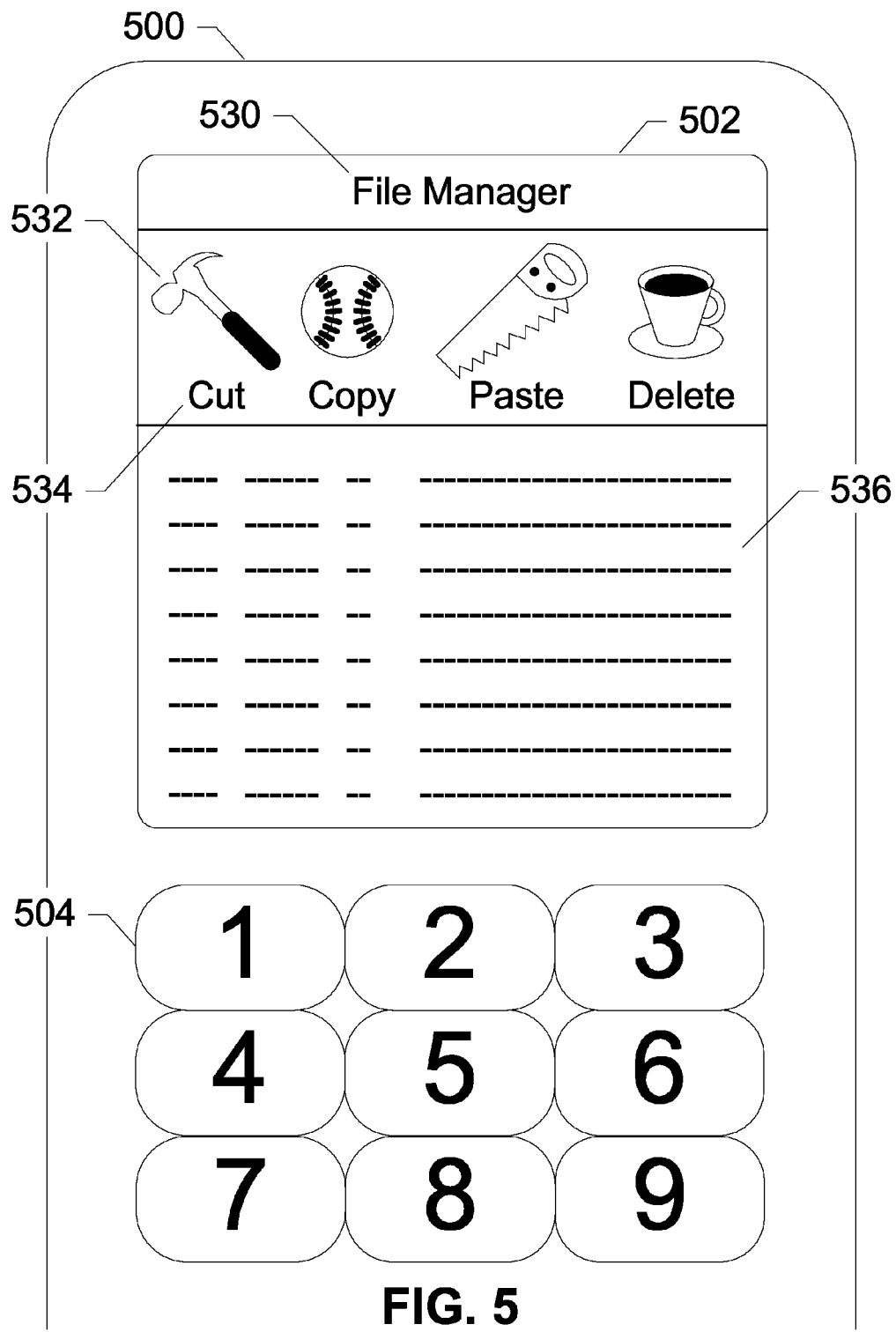
FIG. 5 shows a file manager conveying gesture commands on a mobile device, according to an exemplary embodiment of the present subject disclosure.

FIG. 5 shows a file manager 530 conveying gesture commands on a mobile device 500, according to an exemplary embodiment of the present subject disclosure. File manager 530 shows the contents of a memory on mobile device 500 on display 502. The contents of the memory include a plurality of files 536 and their attributes. File Manager 530 includes a menu of file operations at the top. Each file operation includes a gesture icon 532 and a corresponding file operation 534. When the user performs a gesture associated with gesture icon 532, file operation 534 is performed. Depending on the type of file operation, another menu may open so that the user can specify more parameters to complete the file operation. Files in file manager 530 may need to be selected before conducting a file operation. A keypad 504 is used to select one or more files before performing an operation.

The programs in FIGS. 3-5 are exemplary embodiments of how a gesture command is conveyed to a user on a mobile device. There are many other devices which support gesture input, such as a desktop computer, notebook computer, Personal Digital Assistant (PDA), etc. Though the gesture input may vary from embodiment to embodiment, the conveyance of a gesture command is substantially the same: a gesture icon is displayed next to a command.

Figure 6:
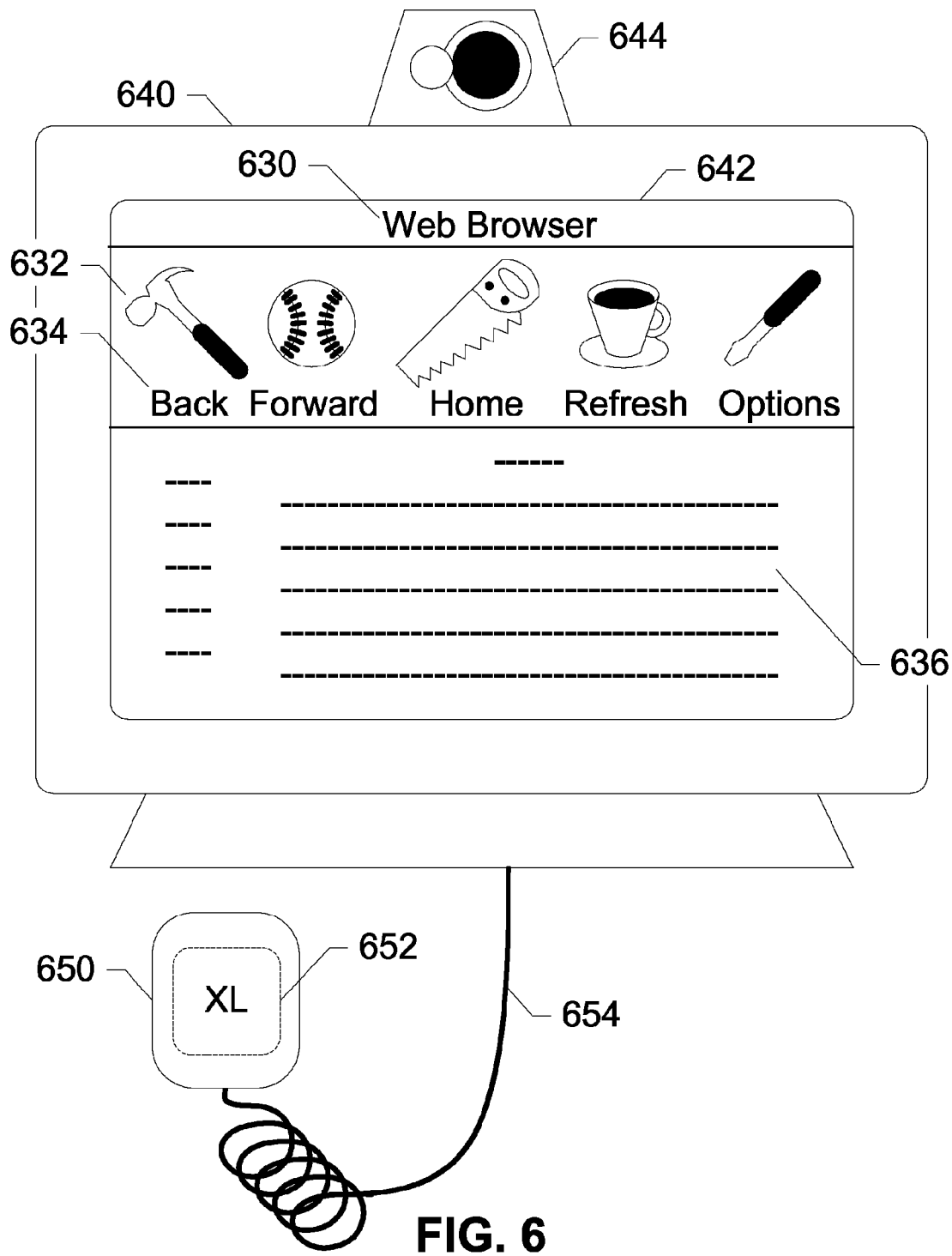
FIG. 6 shows a computer for conveying gesture commands, according to an exemplary embodiment of the present subject disclosure.

FIG. 6 shows a desktop computer 640 for conveying gesture commands, according to an exemplary embodiment of the present subject disclosure. Computer 640 includes a display 642, a camera 644, and an external gesture input device 650. External gesture input device 650 includes an accelerometer 652 and a cable 654 to connect to computer 640. Display 642 shows a web browser 630 including a website 636. A navigation menu is at the top of web browser 630 and includes gesture icons 632 associated with navigation commands 634. When a user performs a gesture, the gesture is detected by either external gesture input device 650 or camera 644. The gesture is then compared with a gesture database to determine a match. If there is a match, for example, the gesture matches gesture icon 632, then navigation command 634 associated with that gesture is executed. In this exemplary embodiment, the hammer gesture icon is labeled with a "Back" command. When the user performs a downward motion with external gesture input device 650, computer 640 executes the "Back" command, and web browser 630 displays the previously displayed web page. Alternately the user can perform the gesture in front of camera 644. Camera 644 then detects the gesture of a hammer, and executes the command. Upon execution of the "Back" command, web browser 630 displays the previously displayed web page.

For devices with multiple ways of accepting gesture input, a particular input type may be selected before making the gesture. However, this may seem limiting to some users. In other embodiments, a gesture is accepted from any input available to the device. In further embodiments, a user may input the gesture using multiple gesture inputs. For example, a user may perform the gesture on the external gesture input device 650 in front of the camera 644. The accelerometer 652 in the external gesture input device 650 detects the gesture at the same time the camera 644 detects the gesture. In these embodiments, the gesture logic accepts input from both inputs to determine the correct command with better accuracy.

A gesture database can come with predefined gesture commands. A user can modify and customize various menus within a device by selecting gestures from the gesture database that the user is most comfortable with. However, advanced users may want to create their own gesture commands. In some embodiments, the gesture logic has an ability to create custom gesture commands.

Figure 7:
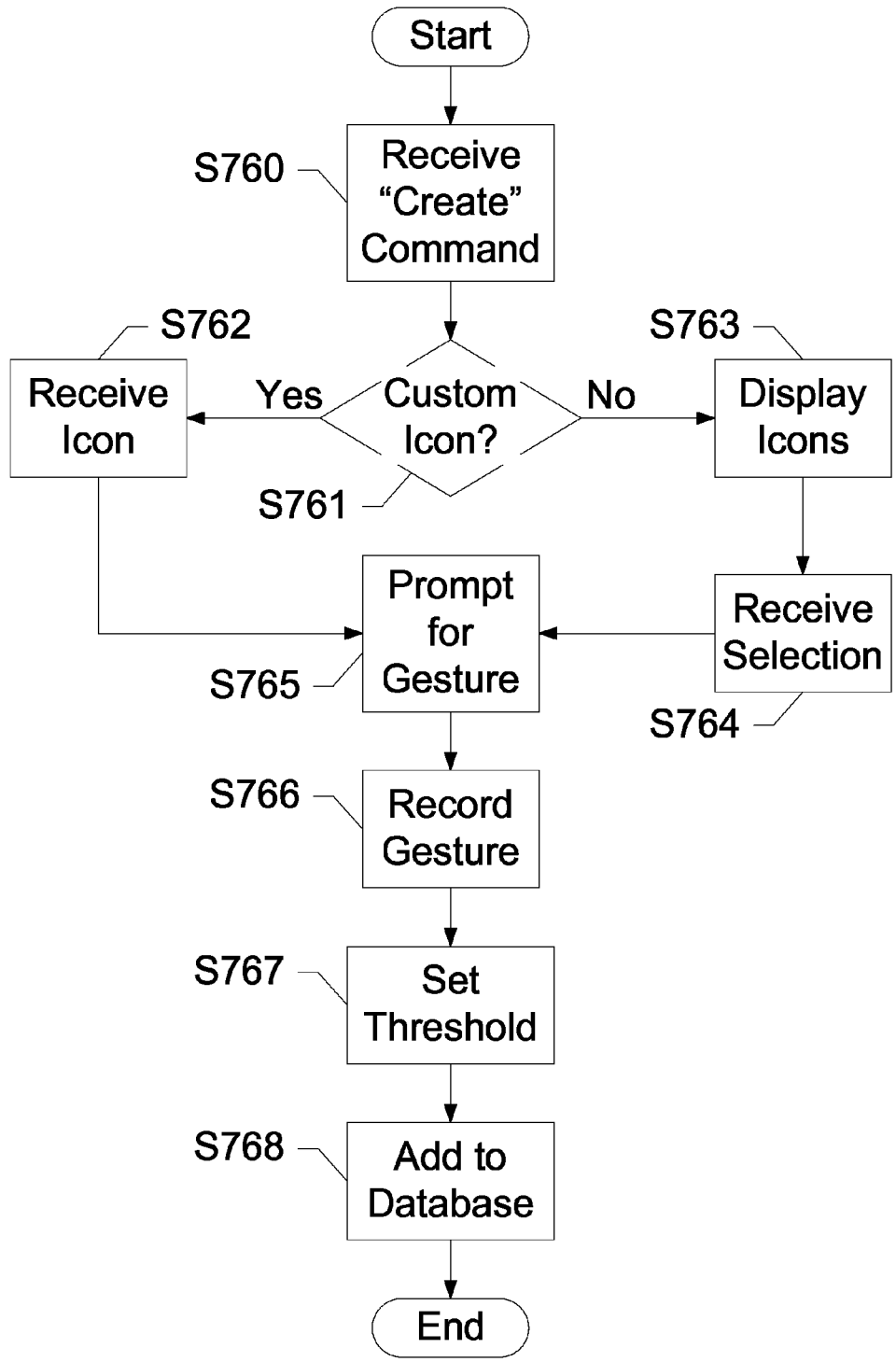
FIG. 7 shows a flow chart for setting a gesture command, according to an exemplary embodiment of the present subject disclosure.

FIG. 7 shows a flow chart for setting a gesture command, according to an exemplary embodiment of the present subject disclosure. When a user desires to create a new gesture command, a "create gesture" command is input into the device S760. The device first queries the user on whether to use a custom icon or a predesigned icon S761. If the user elects to use a custom icon, then the user must show the device which icon to use, or upload an icon S762. If the user elects to use a predesigned icon, then the device displays a plurality of predesigned icons for the user to choose from S763. Once chosen, the device receives the selection S764. Regardless of how the icon is chosen, the user is then prompted to input a gesture S765. The user then inputs a gesture which is recorded on the memory of the device S766. Once recorded, the device prompts the user to specify a threshold for the gesture. The threshold aids in interpreting a gesture that is not performed exactly the same as the recorded gesture by creating a buffer around the gesture. If the user is confident that the gesture will be performed with precision, then a low threshold is set. Conversely, if the gesture seems loose and unrefined, then a high threshold is set. Once the user has made a decision about the threshold, the threshold is set S767. The gesture is then added to the database S768, and may be displayed next to a command for use in a menu.

In other exemplary embodiments, the gesture logic is used to modify the gestures and/or icons from existing, or even predefined gesture commands. To accommodate images of different file types and sizes, some exemplary embodiments of the gesture logic converts and resizes image files to maximize usability as a gesture icon.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A device comprising:
   a processor; and
   a memory that stores instructions that, when executed by the processor, cause the processor to perform operations comprising
   storing, in the memory, a gesture database comprising a digital output associated with a gesture and a threshold associated with the digital output, wherein the gesture comprises a movement of the device, wherein the movement corresponds to a further movement that is associated with a real object that is wielded along a predictable path of motion, and wherein a gesture icon is associated with the gesture and comprises a depiction of the real object,
   receiving a command to create a custom gesture,
   determining that a custom gesture icon is to be used with the custom gesture to be created,
   receiving the custom gesture icon,
   prompting for the custom gesture,
   recording the custom gesture on the memory,
   setting a custom threshold associated with the custom gesture,
   adding the custom gesture to the gesture database with the custom gesture icon and the custom threshold,
   displaying, on a display, the gesture icon associated with the gesture and a gesture command label that labels the gesture icon with a command associated with the gesture and the gesture icon,
   receiving, during movement of the device, a further digital output generated by a gesture sensor, the further digital output representing motion during the movement of the device,
   comparing the further digital output to the digital output and the threshold,
   determining if the further movement matches the movement associated with the gesture and the real object within the custom threshold,
   if a determination is made that the further movement does not match the movement associated with the gesture and the real object within the custom threshold, outputting a sound on a speaker coupled to the processor, and
   if a determination is made that the further movement matches the movement associated with the gesture and the real object within the specified custom, executing the command associated with the gesture.

2. The device of claim 1, wherein the gesture sensor comprises an accelerometer.

3. The device of claim 1, wherein the gesture sensor comprises a gyroscope.

4. The device of claim 1, further comprising instructions that, when executed by the processor, cause the processor to perform operations further comprising:
   displaying a list of contacts, the gesture icon being displayed with a first contact of the list of contacts and a gesture label comprising a name associated with the contact; and displaying, with a further contact of the list of contacts, the custom gesture icon and a custom gesture label, the custom gesture label comprising a further name associated with the further contact.

5. The device of claim 1, further comprising instructions that, when executed by the processor, cause the processor to perform operations further comprising displaying a file manager display that comprises:
   a plurality of files stored in the memory;
   attributes associated with the plurality of files; and
   a menu comprising file operations, wherein each of the file operations comprises a file operation gesture icon indicating a movement of the device that, if performed, causes the processor to perform the associated file operation.

6. The device of claim 1, wherein the gesture icon depicts a hammer, and wherein the gesture comprises a downward movement of the device.

7. The device of claim 1, further comprising instructions that, when executed by the processor, cause the processor to perform operations further comprising displaying, on the display, the custom gesture icon associated with the custom gesture and a custom gesture command label that labels the custom gesture icon with a custom command associated with the custom gesture and the custom gesture icon.

8. A mobile communication device comprising:
   a processor; and
   a memory that stores computer-readable instructions that, when executed by the processor, cause the processor to perform operations comprising
      storing, in the memory, a gesture database comprising a digital output associated with a gesture and a threshold associated with the digital output, wherein the gesture comprises a movement of the device, wherein the movement corresponds to a further movement that is associated with a real object that is wielded along a predictable path of motion, and wherein a gesture icon is associated with the gesture and comprises a depiction of the real object,
      receiving a command to create a custom gesture,
      determining that a custom gesture icon is to be used with the custom gesture to be created,
      receiving the custom gesture icon,
      prompting for the custom gesture,
      recording the custom gesture on the memory,
      setting a custom threshold associated with the custom gesture,
      adding the custom gesture to the gesture database with the custom gesture icon and the custom threshold,
      displaying, on a display, the gesture icon associated with the gesture and a gesture command label that labels the gesture icon with a command associated with the gesture and the gesture icon,
      receiving, during movement of the mobile communication device, a further digital output generated by a gesture sensor, the further digital output representing motion during the movement of the mobile communication device,
      comparing the further digital output to the digital output and the custom threshold,
      determining if the further movement matches the movement associated with the gesture and the real object within the custom threshold,
      if a determination is made that the further movement does not match the movement associated with the gesture and the real object within the custom threshold, outputting a sound on a speaker coupled to the processor, and
      if a determination is made that the further movement matches the movement associated with the gesture and the real object within the custom threshold, executing the command associated with the gesture.

9. The mobile communication device of claim 8, wherein the gesture sensor comprises a gyroscope.

10. The mobile communication device of claim 8, wherein the gesture sensor comprises an accelerometer.

11. The mobile communication device of claim 8, wherein the gesture sensor comprises a magnetometer.

12. The mobile communication device of claim 8, further comprising a camera, wherein the gesture sensor comprises the camera.

13. The mobile communication device of claim 12, wherein the instructions, when executed by the processor, cause the processor to perform operations further comprising displaying a menu comprising a plurality of commands, the gesture icon being displayed with a first command of the plurality of commands, wherein the commands comprise a contacts command that, when selected, causes the processor to display a portion of a contact list stored in the memory.

14. The mobile communications device of claim 8, further comprising:
   displaying a file manager display that comprises a plurality of files stored in the memory, attributes associated with the plurality of files, and a menu comprising file operations, wherein each of the file operations comprises a file operation gesture icon indicating a device motion that, if detected, causes the device to perform the associated file operation;
   detecting selection of one of the plurality of files;
   detecting the motion; and
   in response to detecting the motion, performing the associated file operation on the one of the plurality of files.

15. A method comprising:
   storing, by a device executing a gesture logic, a gesture database in a memory, the gesture database comprising a digital output associated with a gesture and a threshold for the digital output, wherein the gesture comprises a movement of the device, wherein the movement corresponds to a further movement that is associated with a real object that is wielded along a predictable path of motion, and wherein a gesture icon is associated with the gesture and comprises a depiction of the real object;
   receiving a command to create a custom gesture;
   determining that a custom gesture icon is to be used with the custom gesture to be created;
   receiving the custom gesture icon;
   prompting for the custom gesture;
   recording the custom gesture on the memory;
   setting a custom threshold associated with the custom gesture;
   adding the custom gesture to the gesture database with the custom gesture icon and the custom threshold;
   displaying, by the device, the gesture icon associated with the gesture and a gesture command label that labels the gesture icon with a command associated with the gesture and the gesture icon;
   receiving, by the device, a further digital output generated by a gesture sensor during movement of the device;
   comparing, by the device, the further digital output to the digital output to determine if the further movement matches the movement associated with the gesture and the real object;

if a determination is made that the further movement does not match the movement associated with the gesture and the real object, outputting, by the computer, a sound on a speaker coupled to the processor; and if a determination is made that the further movement matches the movement associated with the gesture and the real object, executing the command associated with the gesture.

16. The method of claim 15, further comprising:
displaying a list of contacts, the gesture icon being displayed with a first contact of the list of contacts and a gesture label comprising a name associated with the contact; and
displaying, with a further contact of the list of contacts, a further gesture icon and a further gesture label, the further gesture label comprising a further name associated with the further contact.

17. The method of claim 15, further comprising displaying a menu comprising a first command and a second command,
wherein the first command is displayed with the gesture icon and a gesture label, and
wherein the second command is displayed with a further gesture icon and a further gesture label.

18. The method of claim 15, further comprising:
displaying a file manager display that comprises a plurality of files stored in the memory, attributes associated with the plurality of files, and a menu comprising file operations, wherein each of the file operations comprises a file operation gesture icon indicating a device motion that, if detected, causes the device to perform the associated file operation;
detecting selection of one of the plurality of files;
detecting the motion; and
in response to detecting the motion, performing the associated file operation on the one of the plurality of files.

19. The method of claim 15, wherein the gesture icon depicts a saw, and wherein the gesture comprises a back and forth motion of the device.

20. The method of claim 15, further comprising:
in response to the determination that the further movement does not match the movement associated with the gesture and the real object,
determining if the further movement matches a movement associated with the custom gesture and the real object within the custom threshold;
if a determination is made that the further movement does not match the movement associated with the custom gesture and the real object within the custom threshold, outputting the sound on the speaker coupled to the processor, and
if a determination is made that the further movement matches the movement associated with the custom gesture and the real object within the custom threshold, executing a command associated with the custom gesture.

* * * * *